March 21, 1961   C. W. HEDBERG ET AL   2,976,130
GAS–SOLID CONTACTOR
Filed Aug. 30, 1954   4 Sheets-Sheet 1
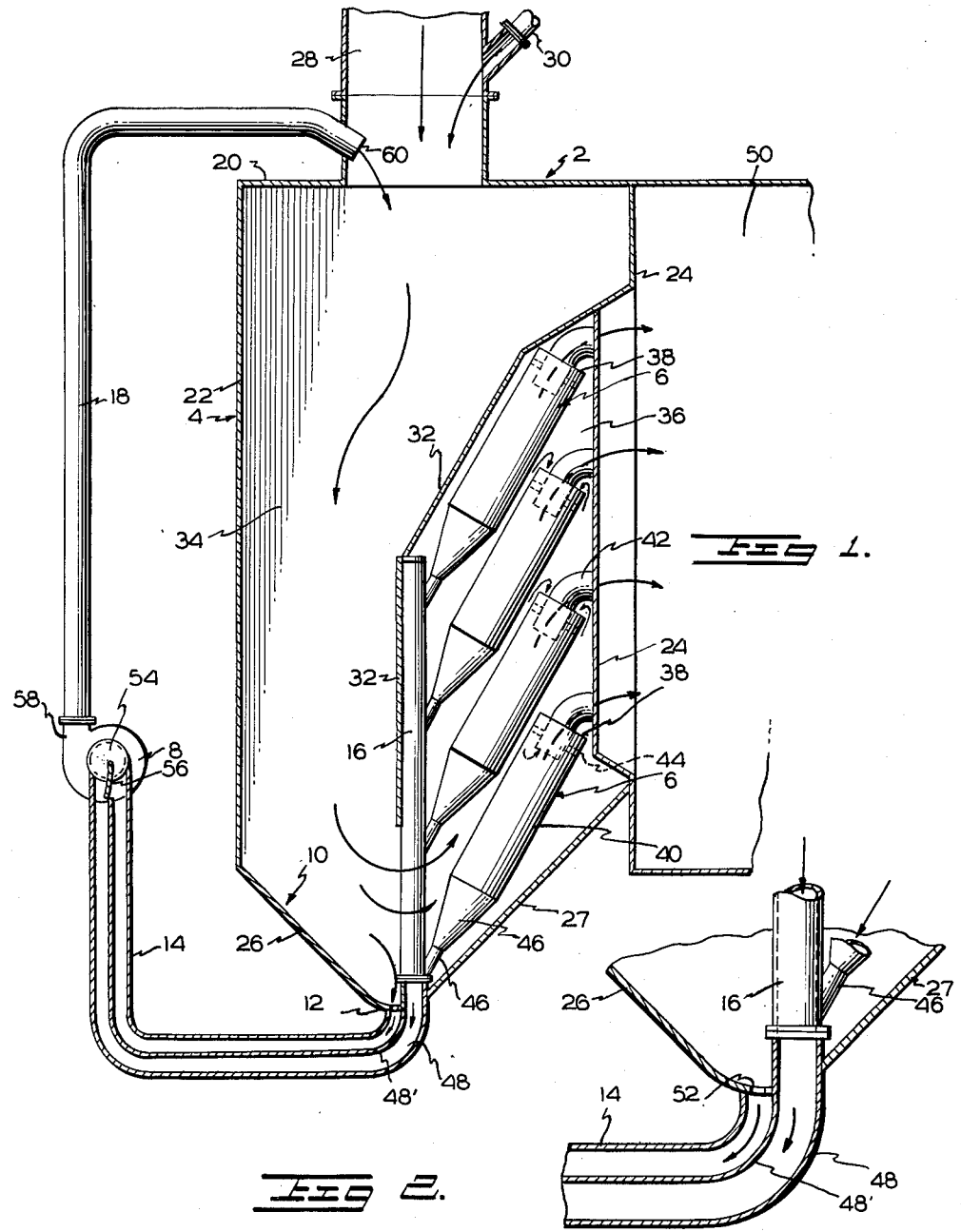
INVENTORS
CARL W. HEDBERG &
RUDOLF G. STREUBER
BY Harold T. Stowell
ATTORNEY

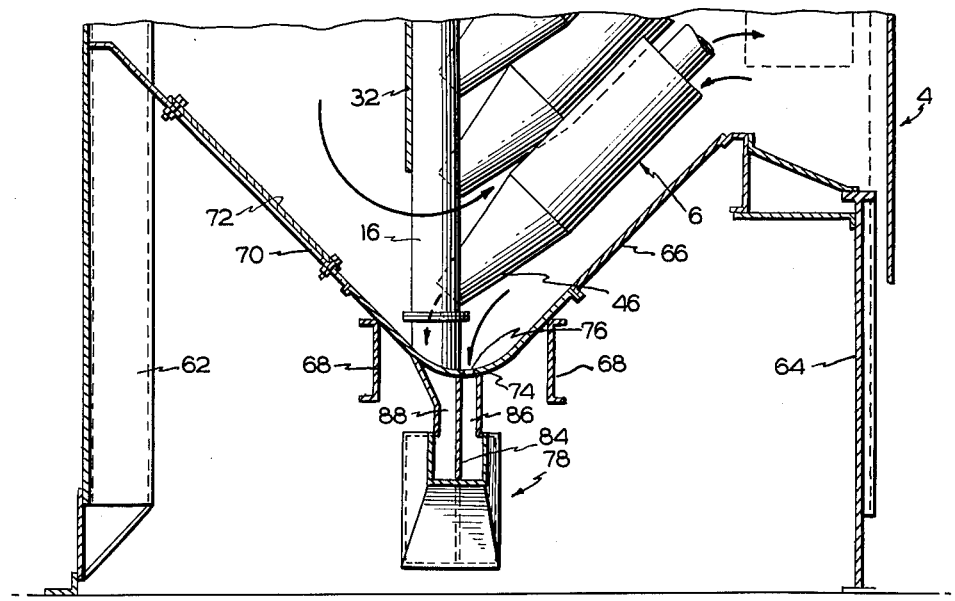
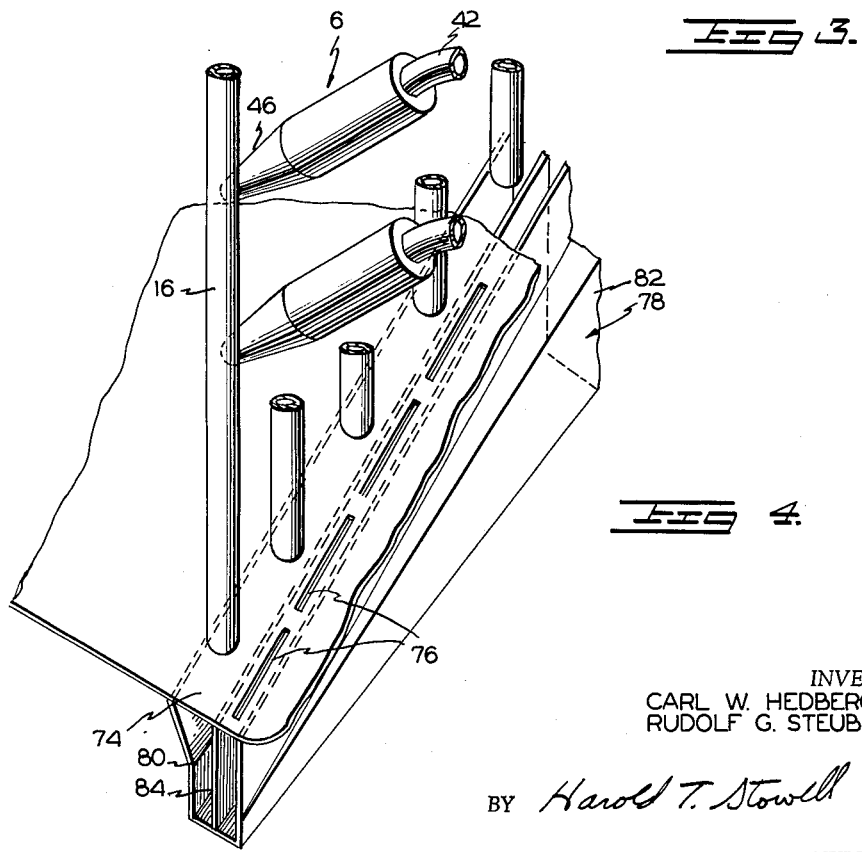

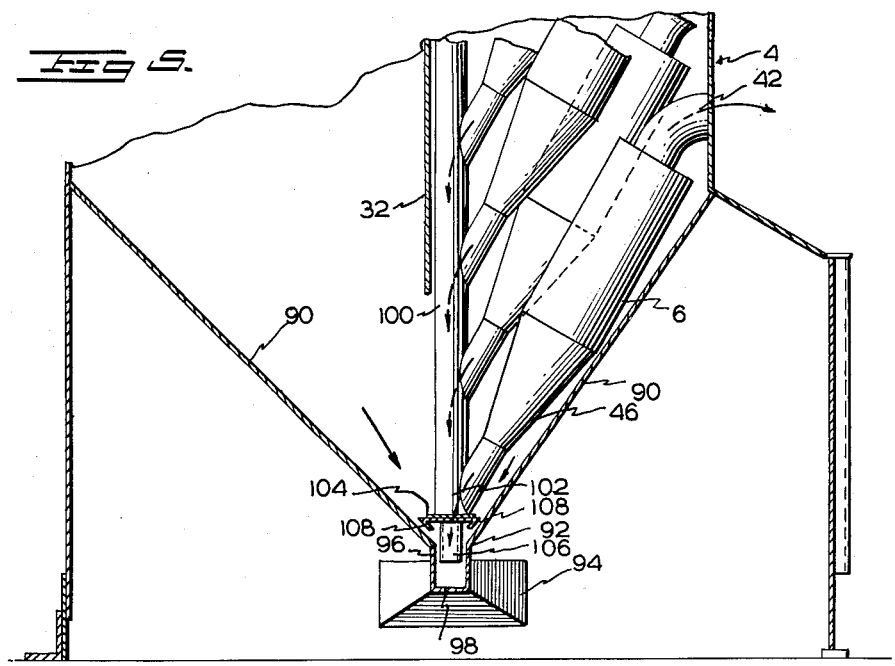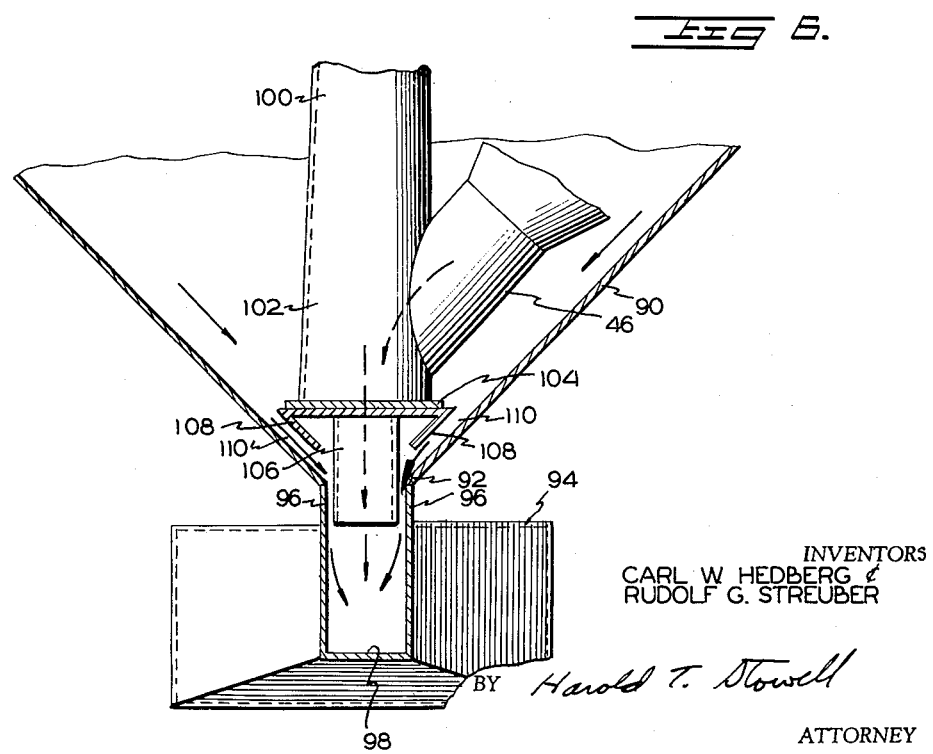

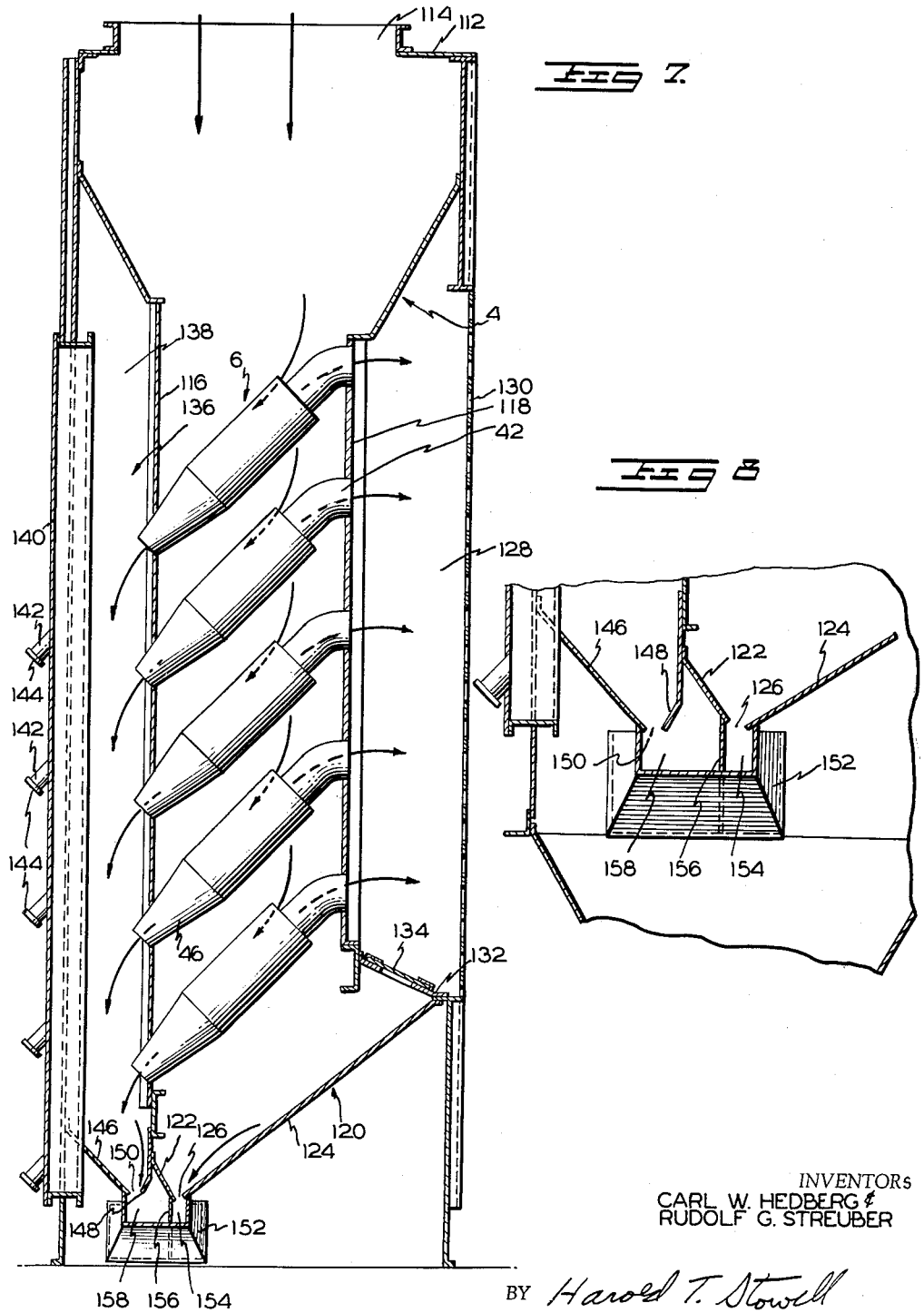

United States Patent Office 2,976,130
Patented Mar. 21, 1961

2,976,130

GAS-SOLID CONTACTOR

Carl W. Hedberg, Bound Brook, and Rudolf G. Streuber, Somerville, N.J., assignors to Research Corporation, New York, N.Y., a corporation of New York Filed Aug. 30, 1954, Ser. No. 452,956

2 Claims. (Cl. 23—284)

This invention relates to gas treating apparatus and methods. More particularly, it relates to apparatus and methods for mixing gas-treating particulate material with gases and separating dust and other contaminating materials from the gases.

Industrial process gases are generally contaminated by suspended dust or other solid matter, admixed gases or other fluid compounds, or both. Many types of equipment and methods have been devised to cope with the problem of decontaminating industrial gases to a sufficient extent that they may be exhausted into the atmosphere without creating atmospheric pollution. However, the process gases which arise in some industries contain contaminants which present serious removal problems even for the present, highly developed gas treating equipment. For example, fluorine contamination presents fertilizer, aluminum, petroleum and other industries with serious difficulties in the disposal of their process emission gases.

Fluorine contamination of industrial gases is particularly troublesome because the fluorine is generally present as gaseous fluorine compounds, solid suspended fluorine compounds and gaseous fluorine compounds absorbed on the surface of dust. Consequently, standard gas purifying methods are not suited to the satisfactory removal of fluorine from industrial gases.

A partial solution to the effective removal of fluorine materials from industrial gases has been achieved by the addition of powdered alkaline materials, e.g., calcium carbonate, to the gases followed by the removal of the alkaline treating material from the gases along with dust in a gas cleaning operation. A procedure of this general type is disclosed in copending application of W. H. Blessing et al., Serial No. 343,338, filed March 19, 1953, for "Fluorine Removal," now abandoned.

The treatment of fluorine contaminated gases with powdered calcium carbonate or similar basic materials, while aiding in fluorine removal, creates new problems in gas cleaning operations. Thus, it is not sufficient to merely add the powdered alkaline gas treating material to the contaminated gas, but it is necessary that, after admixture, the gas and suspended treating particles be subjected to an operation which permits the suspended alkaline material to react with the fluorine components of the gas stream. A method of accomplishing this is described in the copending application Serial No. 343,338, according to which powdered alkaline gas treating material is introduced into the fluorine contaminated gas stream, the mixture of treating material and gases is subjected to a vortical action, a portion of the gas containing concentrated particulate matter is then skimmed off from the main gas stream and the skimmed off portion is recycled to join new portions of gas to be treated.

The addition of dry alkaline gas treating material to fluorine contaminated gas streams has been found to create problems because particulate material builds up in the bottom of the chamber in which reaction takes place between the treating particles and the contaminated gas. Such build-up or caking of treating particles causes a loss in active concentration of the particles in the gas stream, thus reducing the effectiveness of the fluorine removal operation. Furthermore, this reduction in effective amount of treating material is accompanied with an increase in the carry-over of dust as well as alkaline gas treating material to the subsequent particle separation and gas cleaning operations so that the effectiveness of the subsequent operations is decreased.

The principal object of the invention is the provision of new gas treating apparatus and new gas treating methods.

Further objects include:

The provision of apparatus which may be used to introduce finely powdered, solid gas treating material into a gas stream and bring about a reaction between gaseous components of the stream and the solid treating material without having any substantial amount of the gas treating solids accumulate in the reaction chamber and mechanical dust separators comprising the gas treating equipment;

The provision of methods for treating gas streams contaminated by both suspended solid material and admixed gaseous material, e.g., fluorine contaminated industrial exhaust gases, in which an alkaline particulate material is suspended in the gas stream and allowed to react with contaminating components of the gas and thereafter is separated from the gas stream;

The provision of apparatus for the purification of fluorine contaminated industrial gases, as well as the purification of other industrial gases requiring the addition of the gas treating particulate material in order to bring about a decontamination of the gas;

The provision of gas treating apparatus which comprises unique arrangements of gas conduits and other equipment elements which prevent the accumulation of dust and the caking or building up of solid gas treating particulate material and the like in the bottom of the gas treating apparatus, along the gas conduits, treating tubes and other elements of the equipment;

The provision of gas treating apparatus incorporating gas recycle means and having a special arrangement of gas conduits to prevent short circuiting of the gas stream around the recycle means.

Further objects and advantages of the invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

The objects of the invention are accomplished by a gas treating method for separating contaminating materials from a stream of industrial gas which comprises injecting gas treating solid particulate material, for example, calcium hydroxides and powdered calcium carbonate etc., into the gas stream, causing the resulting gaseous suspension to flow into a confined zone having a single bottom region to which material within the zone flows due to gravity, causing interaction of the contaminating materials contained in the gas stream and the injected particulate material by creating an agitating flow of the gaseous suspension within said zone, dividing the gas passing through said zone into a principal portion and a secondary portion by applying suction to said bottom region of said zone, causing a part of the gas within the zone to pass therefrom by way of said bottom region as a secondary gas portion which carries with it solid particulate material that collects under the influence of gravity in said bottom region of the confined zone, leaving behind the principal portion of gas, mechanically separating particulate material from the principal gas portion remaining within said zone, dividing said principal gas portion into a major clean stream and a minor dust enriched stream, removing said separated particulate material from said zone with said minor stream, uniting said minor stream with said secondary gas portion and recycling the united gases back into said zone together with the solid particulate material removed from said zone.

Such a gas treating method can be carried out in gas treating apparatus which basically comprises a gas treating chamber, a bottom in said chamber having a V-shaped section whose apex provides a gravity flow collection region for the chamber, a plurality of mechanical gas separators connected within said chamber so that gas leaving the chamber must pass through the separators, means for creating a suction upon gas within said chamber, conduit means joining the dust collector outlets of said separators to said suction means, openings along said bottom apex through which material can pass out from within the chamber, conduit means connecting said openings for flow of fluid to said suction means, and a conduit for recycling gas from the outlet of said suction means back into said chamber.

Preferably the suction means used to withdraw the secondary gas portion from the bottom of the gas treating chamber is a centrifugal fan connected by tubular conduits or the like to both the mechanical gas separator dust outlets and the slotted chamber bottom apex through a dampening or valve device which will control the portion of gas entering the suction means from said chamber slots and said separator outlets. The conduit means which joins the suction fan to the slotted chamber outlet can be the same as the conduit means which joins the suction fan with the mechanical separator dust outlets. Advantageously, the conduit means are horizontal and expand in cross section as they approach the suction means through that portion of the conduit which is adjacent the slotted chamber bottom.

A more complete understanding of the new improvements provided in methods of treating gas and gas treating apparatus can be had by reference to the accompanying drawings in which:

Figure 1 is a diagrammatic cross sectional side view of one form of gas treating apparatus of the present invention;

Figure 2 is an enlarged fragmentary side sectional view of the chamber bottom portion of the apparatus of Figure 1;

Figure 3 is a fragmentary side sectional view of the bottom portion of a modified form of gas treating apparatus of this invention;

Figure 4 is a fragmentary perspective view of the apparatus shown in Figure 3;

Figure 5 is a fragmentary side esectional view of the bottom portion of still another modified form of apparatus of this invention;

Figure 6 is a fragmentary enlarged side sectional view of the lowermost portion of the apparatus shown in Figure 5;

Figure 7 is a side sectional view of still another modified form of gas treating apparatus according to this invention; and Figure 8 is an enlarged fragmentary side sectional view of the recycle stream drawoff portion of the apparatus shown in Figure 7.

Referring in detail to the drawings, beginning with Figure 1, the gas treating apparatus 2 comprises gas treating chamber 4, mechanical gas separators 6, suction means 8, chamber bottom 10 having a gravity flow collection region collectively designated 12, conduit means 14, joining the bottom collection region 12 to suction means 8, conduit means 16 for connecting the separators 6 with suction means 8 for fluid flow between the two and gas recycle conduit 18.

The chamber 4 is formed by a top 20 which in the form of the apparatus shown in Figure 1 is a flat plate, but which can take other forms for example, conical, back panel 22, front panel 24 and a V-shaped bottom 10 whose apex end 12, formed between legs 26 and 27, is the region of the chamber 12 into which particulate material collects that falls through the chamber under the influence of gravity.

A raw gas inlet duct 28 is connected to the chamber top 20 such as by welding. An injector line or pipe 30 enters the duct 28 at an angle to permit injection of a gaseous suspension of powdered gas treating material, such as calcium carbonate, into the stream of gas passing through the inlet 28.

The chamber 4 is divided by the central partition 32 into a reaction section 34 and a mechanical separator and reaction section 36. The partition 32 causes the gas to flow from the inlet 28 first into the chamber section 34, then down toward the bottom 10 of the chamber and finally upwardly toward the inlet ends 38 of the separators 6 in a fashion designated by the direction arrows.

The mechanical gas separators 6 in Figure 1 are of the cyclone or vortical type although they can be of other types known to the art. The separators 6 have a central separator chamber 40, cleaned gas outlet 42, gas turning vanes 44, gas inlet openings between the outlet 42 and the chamber side 40 at the end 38 and separated dust outlets 46. The outlets 46 are joined to the conduits 16 which form manifold through which particulate material separated in the separator 6 is removed along with a minor portion of the gas stream entering the separators. A collector drawoff tube 48 joins the manifolds to the recirculating fan or suction device 8.

The clean gas outlets 42 are fixed, such as by welding, to the front panel 24 of the chamber 4 through openings therein so that gas leaving the apparatus 2 must pass through separator 6 out the outlets 42 into the gas outlet 50.

The apex end 12 of the bottom 10 has a plurality of openings 52 therein through which material that falls to the bottom of the chamber 4 by the influence of gravity may pass out from within the chamber along with the flow of secondary gas portion removed from the chamber through conduit 14 by means of recirculating fan 8. The openings 52 may take various shapes, for example, circular holes, although these openings are preferably slots having a longitudinal axis which runs parallel to the axis of the apex 13 of the bottom 10.

Both conduit 14 and drawoff pipe 48 join at their outlet end to the inlet 54 of the recirculating fan 8. The dividing wall 48' between the two conduits all the way from the chamber to the suction means 8 serves to prevent short circuiting of gas through the mechanical separator 6. If this should occur, gas flowing up conduits 16 and through the nipples of the separated dust outlets 46, would prevent the separator tubes from operating and substantially all of the dust would pass out through the clean gas discharge tubes 42.

A gas proportioning valve or damper 56 is located in the inlet 54 to the fan 8 so that the proportion of gas flowing through either conduit 14 or 48 into the fan may be controlled. Such gas flow proportioning permits the ratio of secondary gas portion from chamber section 34 and minor gas stream from separator 6 to be controlled and consequently controls the ratio of dust from separator 6 and particulate material from chamber 34 entering recycle tube 18.

The fan 8 discharges through outlet 58 into recycle tube 18 whose outlet end 60 enters the bottom of the raw gas inlet 28.

In the form of apparatus shown in Figures 3 and 4, the chamber 4 is supported upon the frame members 62 and 64 while the V-shaped bottom 66 is supported upon the channel members 68. The bottom 66 has an access opening 70 therein over which the removable plate 72 is bolted.

The apex 74 of the V-shaped bottom 66 is provided with a plurality of slots 76 which serve to connect the interior of chamber 4 to the expanding dust conduit 78. The conduit 78 tapers from the small end 80 which is upstream of the recirculating suction fan, outwardly toward the downstream end 82. A common partition plate 84 divides the expanding conduit 78 into a settled dust side 86 and a separator collected dust side 88. The tubes 16 connect the dust discharge ends 46 of the mechanical dust separators 6 to the side 88 of the expanding conduit 78.

The partition plate 32 causes the gas entering the chamber 4 to flow toward the bottom 66 before it can pass through the mechanical separators 6. As a consequence, some dust is caused to settle out before the gas suspension reaches the mechanical separators and this settled out dust falls to the gravity collection region 74 of the bottom 66. The secondary portion of gas which passes through the slots 76 under the suction of the recirculating fan, carries this settled dust through into the conduit side 86 while the minor gas stream from the mechanical separator 6 carries the dust and other particulate material removed from the major gas stream in the mechanical separators down the tube 16 into the side 88 of the conduit 78.

In the form of apparatus shown in Figures 5 and 6, the gas treating chamber 4 has a V-shaped bottom 90 whose apex end 92 is open along its entire length. An expanding flue or conduit 94 is connected by narrow plate members 96 to the open end 92 of bottom 90. The flue 94 expands from the end 98 which is upstream of the suction fan (not shown) toward the downstream end.

The dust discharge ends 46 of the mechanical separators 6 discharge into tubes 100 which taper outwardly from the top end toward the bottom end 102. The bottom ends 102 of tubes 100 are covered by a plate 104 and a nozzle 106 is fastened to an opening in the plate 104 so that gas descending in the tubes 100 will be forcefully ejected into the expanding flue 94.

The plate 104 is provided at both sides with flanges 108 which form restricted passages 110 and 110' between them and the bottom 90. Dust and other particles which settle out by the action of gravity in the chamber 4 fall along the bottom 90 toward the bottom apex 92. In doing so, settled dust passes to the passages 110 and 110' where it is picked up by the minor portion of gas which leaves chamber 4 through flue 92 by way of passages 110 and 110'. The suspension of minor gas portion and settled dust mix with the minor gas stream and separated dust from mechanical separators 6 when this latter suspension issues from nozzles 106. The opening in nozzles 106, and the passages 110 and 110' are so proportioned that there is no reverse flow of gas up through the separator tubes 6. The intermixed gas and particulate material from nozzles 106 and passages 110 and 110' is then conveyed by duct 94 through a suction fan and recycle tube back into the chamber 4.

The gas treating apparatus of the type shown in Figures 7 and 8 has a gas treating chamber 4 comprising a top 112 provided with a raw gas inlet opening 114, back panel 116, front panel 118, and a V-shaped bottom 120. The bottom 120 is formed with a short leg 122 and a long leg 124 between the lower ends of which there is a slot or opening 126.

Mechanical separators of the cyclone type 6 are mounted within the chamber 4 between the front and back panels 116 and 118 so that the dust discharge ends 46 of the separators extend through openings in the back panel 116 while the clean gas outlets 42 are fixed to the front panel 118 so that cleaned gas leaving the separator 6 will discharge into the flue 128 and will then pass through the perforated plate 130 to proceed to an electrostatic precipitator (not shown) or other gas cleaning device.

The bottomside portion 132 of the cleaned gas outlet flue 128 is provided with a slide damper device 134 to permit gas to be by-passed from chamber 4 around the separators 6 directly into the outlet flue 128. This damper, therefore, provides for partial control of gas through the separator 6 and a proportioning of gas from the chamber 4 into the outlet flue 128.

The conduit means generally designated 136 for handling collected dust and gas discharging from dust collector ends 46 of the separator 6 comprises a dust collecting chamber 138 one side of which is formed by the back panel 116 and the other by outside panel 140. Short sections of pipe 142 provided with caps 144 are welded to proper sized holes formed in panel 140. The capped sections of pipe 142 serve as poke holes to be used in cleaning the separators 6.

The bottom of conduit means 136 is V-shaped and formed of a wide plate 146 and narrow plate 148. The lower ends of these plates are not joined, but have slotted opening 150 between them.

An expanding conduit or flue 152 is fastened to the bottom of the apparatus so that opening 126 discharges into the section 154 of the conduit 152 formed on one side of the common partition 156 while the opening 150 discharges into the section 158 formed on the other side of the common partition 156. The openings 126 and 150 are of controlled, restricted size so that there is uniform gas flow through the sections 154 and 158 of the flue 152 as the gas and either settled or separated dust pass through these flue sections to a suction fan (not shown) and a recycle tube for recirculation into chamber 4 by way of raw gas inlet 114.

Although a variety of different specific forms of the new apparatus of this invention has been shown and described, the procedure for treating gas is generally the same for the different specific forms of equipment, and may be most easily understood by reference to Figure 1.

Raw industrial gas contaminated with process by-products, for example, fluorine compounds, is led by raw gas inlet 28 to the treating chamber 4. The gas treating materials, such as powdered calcium carbonate, suspended in a gas stream are injected into the contaminated gas stream through the injector pipe 30. The resulting gaseous suspension then proceeds downwardly through the chamber section 34 and because of the partition 32 it must pass in a direction generally toward the bottom 10 of the chamber 4. The volume of gas relative to the size of the chamber 4 is such that an agitating flow of the gaseous suspension is created within the chamber section 34. This brings about an interaction between the powdered gas treating material introduced through pipe 30 and the gas stream contaminants, such as fluorine.

A substantial quantity of dust and other particulate material settles out onto the bottom 10 of the chamber 4 under the combined influence of gravity and downward flow of gas. This settled dust falls ultimately to the apex end 12 of bottom 10.

The gas suspension flows beneath the lower end of partition 32 and then up into section chamber 36. In order to get out of chamber 36, the gas must pass into the mechanical separator 6 through the gas turning vanes 44 which impart a whirling action to the gas causing a large portion of the particulate material suspended in the gas stream to be thrown out. The major portion of the gas passing through separator 6 leaves the apparatus 2 through clean gas outlets 42. A minor stream of the gas, on the other hand, exits from the separators 6 through the dust collection ends 46 and discharge into the tubes 16.

Suction is applied to the manifold tubes 16 through conduit 48 and to the slots 52 through the conduit 14 by the recirculation fan 8. As a consequence, a minor portion of the gas passing through chamber 4 is caused to flow out of the chamber through the slots 52 and this minor gas portion carries with it the settled dust from the chamber 4. Likewise, the dust and gas suspension discharged by separator outlets 46 are removed from chamber 4 through conduit 48. At the recirculation fan 8 the streams of gas suspensions passing through conduits 14 and 48 become mixed and are then blown through the recycle tube 18 back into the chamber portion 34.

In a typical installation of apparatus of this invention 80,000 cubic feet per minute of gas are treated, that is, 80,000 cubic feet per minute of raw gas enter inlet 28 and the same amount of cleaned gas leaves the apparatus by flue 50 to be passed on to an electrical precipitator or further gas cleaning operation. The settled dust drawoff conduit 14 typically handles 5,000 cubic feet per minute while the separated dust drawoff conduit 48 handles about 10,000 cubic feet a minute, making a total of 15,000 cubic feet of recycled gas passing through recycle tube 18 back into the gas treating chamber 4. As a consequence, in this operation, about 95,000 cubic feet per minute of gaseous suspension pass through the gas treating chamber 4.

New forms of gas treating apparatus are illustrated in the attached drawings and this apparatus and methods of its use are described in detail above. These new gas treating methods and apparatus make it possible to treat industrial gases which are contaminated with troublesome impurities which require the addition to the gas of a powdered solid gas treating material and which cannot be removed satisfactorily from the industrial gas using the more conventional gas separating equipment and methods. Thus, the new apparatus and methods provide for satisfactory introduction of powdered gas treating materials, such as calcium carbonate, into the contaminated gas stream and the adequate interaction of the gas treating material and the contaminating components of the gas. During the operation of the apparatus of the invention the recirculated lime particles are reduced in size by attrition in passing through the mechanical collectors, recirculating fan and the like until they become too small in size to be effectively removed by the centrifugal separators and pass out of the system through the gas outlet. Thus the buildup of particulate material within the gas reacting chamber is prevented and the gradual overloading of the recirculating system with particles despite the constant, though controlled, addition of fresh lime materials is also prevented by this new equipment and methods so that the gas cleaning operation can be effectively carried out. At the same time, controlled recirculation of settled and mechanically separated particulate material is accomplished so that the maximum effective use of the gas treating material is obtained.

While the new apparatus and methods have been discussed with specific reference to removal of fluorine contaminated industrial gases, they are not limited to fluorine removal and may be employed in other types of gas cleaning operations in which accumulation of settled dust upon the base of the gas treating chamber or in which suitable interaction between injected gas treating particulate material and a contaminated gas stream present special problems.

We claim:
1. Gas treating apparatus comprising a gas treating chamber having a top entering inlet for raw gas and a side exiting outlet for cleaned gas, a V-shaped bottom in the chamber, a plurality of slotted openings along the apex of the chamber bottom, a plurality of cyclone type dust separators positioned one above the other at one side of the chamber, a vertically descending dust collector tube attached to the cyclone separators so as to serve as a manifold outlet for separated dust discharged from said separators, the lower end of said manifold tube passing through an opening in said chamber bottom, a conduit which increases in cross sectional area from one end to the other fixed to the undersurface of said chamber bottom beneath said apex slots and said manifold tube for flow of fluid from said slots and said tube into said conduit and a common partition in the conduit dividing it into two non-communicating sections, one of which communicates with said bottom slots and the other which communicates with said manifold tube.

2. Gas treating apparatus comprising a gas treating chamber, a V-shaped bottom in said chamber, the apex of which is a longitudinal opening which lies in a substantially horizontal plane at the base of the chamber, a horizontally elongated gas conduit which expands in cross section from one end to the other fastened to the underside of said chamber bottom so that fluid may flow from within said chamber through said bottom opening into said conduit, a plurality of mechanical gas separators positioned within said chamber, the separators being spaced in vertical rows a vertical descending dust collector tube for each vertical row of mechanical gas separators, the bottom end of said dust collector tubes terminating slightly above said bottom apex opening, reduced diameter nozzles fitted upon the ends of said tubes extending from the tubes through said apex bottom opening to inject fluid from said tubes into said expanding conduit and web means adjacent said tube ends spaced above said chamber bottom forming an elongated slotted passageway for the flow of fluid from said chamber through said apex opening past said nozzles and into said expanding conduit.

References Cited in the file of this patent

UNITED STATES PATENTS

| | | |
|---|---|---|
| 1,825,707 | Wagner | Oct. 6, 1931 |
| 2,360,355 | McBride | Oct. 17, 1944 |
| 2,533,991 | Blomquist | Dec. 12, 1950 |
| 2,553,175 | Davenport | May 5, 1951 |
| 2,573,704 | Gilbert | Nov. 6, 1951 |
| 2,603,553 | Berg | July 15, 1952 |

FOREIGN PATENTS

| | | |
|---|---|---|
| 674,536 | Great Britain | June 25, 1952 |
| 969,129 | France | Dec. 14, 1950 |